United States Patent
Hsuan et al.

(10) Patent No.: US 8,478,258 B2
(45) Date of Patent: Jul. 2, 2013

(54) TECHNIQUES TO REDUCE FALSE DETECTION OF CONTROL CHANNEL MESSAGES IN A WIRELESS NETWORK

(75) Inventors: Yi Hsuan, Sunnyvale, CA (US); Hujun Yin, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 313 days.

(21) Appl. No.: 12/889,949

(22) Filed: Sep. 24, 2010

(65) Prior Publication Data

US 2011/0216843 A1 Sep. 8, 2011

Related U.S. Application Data

(60) Provisional application No. 61/311,174, filed on Mar. 5, 2010.

(51) Int. Cl.
*H03M 3/00* (2006.01)

(52) U.S. Cl.
USPC .......................................... 455/418; 370/329

(58) Field of Classification Search
None
See application file for complete search history.

(56) References Cited

U.S. PATENT DOCUMENTS

| | | | | |
|---|---|---|---|---|
| 2006/0209734 A1* | 9/2006 | Son et al. | | 370/312 |
| 2007/0047513 A1* | 3/2007 | Anderson | | 370/345 |
| 2008/0039013 A1* | 2/2008 | Chang et al. | | 455/11.1 |
| 2010/0251083 A1* | 9/2010 | Cho et al. | | 714/807 |
| 2011/0002288 A1* | 1/2011 | Lee et al. | | 370/329 |
| 2012/0026965 A1* | 2/2012 | Cho et al. | | 370/329 |
| 2012/0147734 A1* | 6/2012 | Kim et al. | | 370/216 |

OTHER PUBLICATIONS

"Air Interface for Broadband Wireless Access Systems", LAN/MAN Standards Committee of the IEEE Computer Society and the IEEE Microwave Theory and Techniques Society, (Jul. 29 2010), pp. 1-999.

International Preliminary Report on Patentability mailed Sep. 20, 2012 from International Application No. PCT/US2011/025036.

* cited by examiner

*Primary Examiner* — Chi Pham
*Assistant Examiner* — Kouroush Mohebbi
(74) *Attorney, Agent, or Firm* — Schwab, Williamson & Wyatt, P.C.

(57) ABSTRACT

A method and system of reducing false detection of control channel messages in a wireless communication system. This facilitates blind detection of control channel messages in the wireless communication network. In one embodiment of the invention, the control messages in the wireless communication system are randomized or scrambled to minimize or lower the probability of false detection of the control channel messages. The control channel message includes, but is not limited to, an Assignment Advanced Media Access Protocol (A-A-MAP) Information Element (IE) and the like. In one embodiment of the invention, the contents of the A-A-MAP IE are randomized or scrambled before encoding into A-A-MAP symbols.

23 Claims, 6 Drawing Sheets

| 210 A-MAP | 220 A-MAP | 230 A-MAP | 240 A-MAP | | | | |
|---|---|---|---|---|---|---|---|
| 212 DL SF0 | 222 DL SF1 | 232 DL SF2 | 242 DL SF3 | 252 UL SF0 | 262 UL SF1 | 272 UL SF2 | 282 UL SF3 |

TECHNIQUES TO REDUCE FALSE DETECTION OF CONTROL CHANNEL MESSAGES IN A WIRELESS NETWORK

REFERENCE TO RELATED INVENTIONS

This is a non-provisional application corresponding to provisional application Ser. No. 61/311,174 filed Mar. 5, 2010, and claims the priority of that filing date for all common subject matter.

FIELD OF THE INVENTION

This invention relates to false detection, and more specifically but not exclusively, to a method and system of reducing false detection of control channel messages in a wireless system.

BACKGROUND DESCRIPTION

In a wireless network, a base station sends control channel messages such Assignment Advanced Media Access Protocol (A-A-MAP) to the advanced mobile stations (AMS) in the wireless network. Each AMS decodes a plurality of the A-A-MAP from the base station to determine whether it is the intended recipient of the A-A-MAP. In some cases, false detection of the A-A-MAP may occur when a particular AMS has erroneously determined that it is the intended recipient of a particular A-A-MAP message when the particular A-A-MAP is intended for another AMS.

When there is a false detection of an Uplink A-A-MAP, the erroneous AMS can transmit data using the wrong resources and can cause collision of other value traffic. This causes a system level impact on the reliability of the Uplink Hybrid Automatic Repeat Request (HARQ) transmission. When there is a false detection of a Downlink A-A-MAP and when the contents of the A-A-MAP Information Element (IE) are decoded with errors, the erroneous AMS will not be able to decode the data burst correctly. When there is a false detection of a Downlink A-A-MAP and when the contents of the A-A-MAP Information Element (IE) are decoded without any error, the erroneous AMS can decode the corresponding physical data correctly and pass the results to higher layers, which can cause ARQ level corruption.

BRIEF DESCRIPTION OF THE DRAWINGS

The features and advantages of embodiments of the invention will become apparent from the following detailed description of the subject matter in which.

DETAILED DESCRIPTION

Figures 1, 2:
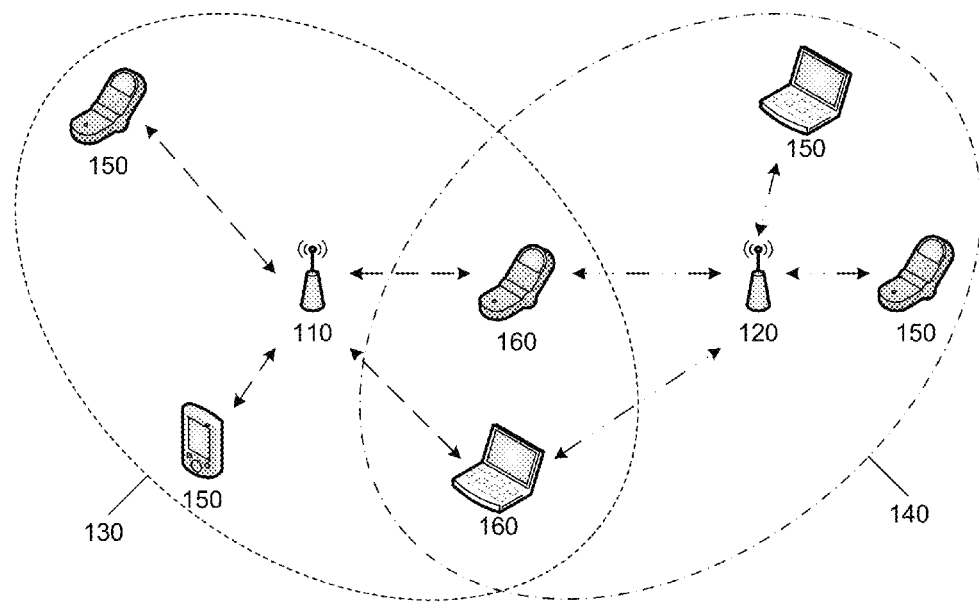
FIG. 1 illustrates a wireless communication network in accordance with one embodiment of the invention.
FIG. 2 illustrates the location of an advanced MAP in a time division duplex mode in one embodiment of the invention.

Embodiments of the invention described herein are illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference numerals have been repeated among the figures to indicate corresponding or analogous elements. Reference in the specification to "one embodiment" or "an embodiment" of the invention means that a particular feature, structure, or characteristic described in connection with the embodiment is included in at least one embodiment of the invention. Thus, the appearances of the phrase "in one embodiment" in various places throughout the specification are not necessarily all referring to the same embodiment.

Embodiments of the invention provide a method and system of reducing false detection of control channel messages in a wireless communication system. This facilitates blind detection of control channel messages in the wireless communication network. In one embodiment of the invention, the control messages in the wireless communication system are randomized or scrambled to minimize or lower the probability of false detection of the control channel messages. The control channel message includes, but is not limited to, an Assignment Advanced Media Access Protocol (A-A-MAP) Information Element (IE) and the like. In one embodiment of the invention, the contents of the A-A-MAP IE are randomized or scrambled before encoding into A-A-MAP symbols.

FIG. 1 illustrates a wireless communication network 100 in accordance with one embodiment of the invention. The wireless communication network 100 includes a plurality of wired and/or wireless networks, generally shown as 130 and 140. In particular, the wireless communication network 100 may comprise a Wireless Local Area Network (WLAN) 130, and a Wireless Metropolitan Area Network (WMAN) 140. Although FIG. 1 depicts two wireless networks, the wireless communication system 100 may include additional or fewer wireless communication networks and one or more wired networks. For example, the wireless communication network 100 may include additional WMANs, WLANs, and/or Wireless Personal Area Networks (WPANs). The methods and apparatus described herein are not limited in this regard.

The wireless communication network 100 has one or more platforms or stations (STA) that include, but are not limited to, base stations, advanced base stations (ABSs), subscriber stations, mobile stations, and advanced mobile STAs (AMSs). The AMSs 160 illustrate multi-radio AMSs capable of heterogeneous wireless communication by accessing a plurality of wireless networks and/or wired networks. The AMSs 150 illustrate single-radio AMSs capable of accessing a single wireless network or a plurality of networks at any one time.

In one embodiment of the invention, the AMSs 150 and 160 include, but are not limited to, wireless electronic devices such as a desktop computer, a laptop computer, a handheld computer, a tablet computer, a cellular telephone, a pager, an audio and/or video player (e.g., an MP3 player or a DVD player), a gaming device, a video camera, a digital camera, a navigation device (e.g., a GPS device), a wireless peripheral (e.g., a printer, a scanner, a headset, a keyboard, a mouse, etc.), a medical device (e.g., a heart rate monitor, a blood pressure monitor, etc.), and/or other suitable fixed, portable, or mobile electronic devices. Although FIG. 1 depicts six AMSs, the wireless communication network 100 may include more or less multi-radio AMSs 150 and/or single-radio AMSs 160 in other embodiments of the invention.

The STAs may use a variety of modulation techniques such as spread spectrum modulation (e.g., direct sequence code division multiple access (DS-CDMA) and/or frequency hopping code division multiple access (FH-CDMA)), time-division multiplexing (TDM) modulation, frequency-division multiplexing (FDM) modulation, orthogonal frequency-division multiplexing (OFDM) modulation, orthogonal frequency-division multiple access (OFDMA), multi-carrier modulation (MDM), and/or other suitable modulation techniques to communicate via wireless communication links.

The subscriber stations, mobile stations, or advanced mobile stations (e.g. multi-radio AMS 160 and a single-radio AMS 150) may use OFDM or OFDMA modulation to transmit digital data by splitting a radio frequency signal into multiple small sub-signals, which in turn, are transmitted simultaneously at different frequencies. In particular, the stations may use OFDM or OFDMA modulation to implement the WMAN 140. The multi-radio AMS 160 and the single-radio AMS 150 may operate in accordance with the 802.16 family of standards developed by Institute of Electrical and Electronic Engineers IEEE to provide for fixed, portable, and/or mobile broadband wireless access (BWA) networks (e.g., the IEEE std. 802.16, published 2004) to communicate with the base station 120, which may be an advanced base station (ABS) via wireless communication link(s).

Although some of the above examples are described above with respect to standards developed by IEEE, the methods and apparatus disclosed herein are readily applicable to many specifications and/or standards developed by other special interest groups and/or standard development organizations (e.g., Wireless Fidelity (Wi-Fi) Alliance, Worldwide Interoperability for Microwave Access (WiMAX) Forum, Infrared Data Association (IrDA), Third Generation Partnership Project (3GPP), etc.). For example, in one embodiment of the invention, the wireless communication network 100 is operable in accordance with 3GPP Long Term Evolution (LTE) standard.

In one embodiment of the invention, the access point 110 and the base station 120 communicate in accordance with specific communication standards, such as the IEEE standards including, but are not limited to, IEEE 802.11(a), 802.11(b), 802.11(g), 802.11(h), 802.11(n), 802.16-2004, 802.16(e), 802.16(m) and their variations and evolutions thereof standards, and/or proposed specifications for WLANs, although the scope of the invention is not limited in this respect as they may also be suitable to transmit and/or receive communications in accordance with other techniques and standards.

For more information with respect to the IEEE 802.11 and IEEE 802.16 standards, please refer to "IEEE Standards for Information Technology—Telecommunications and Information Exchange between Systems"—Local Area Networks—Specific Requirements—Part 11 "Wireless LAN Medium Access Control (MAC) and Physical Layer (PHY), ISO/IEC 8802-11: 1999", and Metropolitan Area Networks—Specific Requirements—Part 16: "Air Interface for Fixed Broadband Wireless Access Systems," May 2005 and related amendments/versions.

The WLAN 130 and the WMAN 140 may be operatively coupled to a common public or private network such as the Internet, a telephone network (e.g., public switched telephone network (PSTN)), a local area network (LAN), a cable network, and/or another wireless network via connection to an Ethernet, a digital subscriber line (DSL), a telephone line, a coaxial cable, and/or any wireless connection, etc.

The wireless communication network 100 may include other suitable wireless communication networks. For example, the wireless communication network 100 may include a wireless wide area network (WWAN) (not shown). The stations may operate in accordance with other wireless communication protocols to support a WWAN. In particular, these wireless communication protocols may be based on analog, digital, and/or dual-mode communication system technologies such as Global System for Mobile Communications (GSM) technology, Wideband Code Division Multiple Access (WCDMA) technology, General Packet Radio Services (GPRS) technology, Enhanced Data GSM Environment (EDGE) technology, Universal Mobile Telecommunications System (UMTS) technology, standards based on these technologies, variations and evolutions of these standards, and/or other suitable wireless communication standards.

The wireless communication network 100 may further include other WPAN, WLAN, WMAN, and/or WWAN devices (not shown) such as network interface devices and peripherals (e.g., network interface cards (NICs)), access points (APs), redistribution points, end points, gateways, bridges, hubs, etc. to implement a cellular telephone system, a satellite system, a personal communication system (PCS), a two-way radio system, a one-way pager system, a two-way pager system, a personal computer (PC) system, a personal data assistant (PDA) system, a personal computing accessory (PCA) system, and/or any other suitable communication system. Although certain examples have been described above, the scope of coverage of this disclosure is not limited thereto.

In one embodiment of the invention, the base station 120 generates an A-A-MAP IE and randomizes the contents of the A-A-MAP IE to generate a randomized A-A-MAP IE. The base station 120 processes the randomized A-A-MAP IE to form A-A-MAP symbols and sends the A-A-MAP symbols to the AMSs 150 and 160. The randomization of the contents of the A-A-MAP IE reduces the probability of false detection by the AMSs 150 and 160 when they decode the contents of the A-A-MAP IE.

FIG. 2 illustrates the location 200 of an advanced MAP (A-MAP) in a time domain division (TDD) mode in one embodiment of the invention. In one embodiment of the invention, the base station 120 sends a superframe to the AMSs 150 and 160. Each superframe is made up of a number of frames and each frame is made up of a number of advanced air interface (AAI) subframes. FIG. 2 illustrates seven AAI sub-frames that are configured in a TDD mode.

The AAI subframes have four Downlink (DL) subframes (SF), DL SF0-SF3 212, 222, 232 and 242 and four Uplink subframes UL SF0-SF3 252, 262, 272 and 282 in one embodiment of the invention. Each of the DL SF0-SF3 212, 222, 232 and 242 has an A-MAP 210, 220, 230 and 240 in one embodiment of the invention. The A-MAP carries service control information that includes, but is not limited to, user-specific control information and non-user-specific control information. The user-specific control information is divided into assignment information, HARQ feedback information, and power control information, and they are transmitted in the assignment A-MAP, HARQ feedback A-MAP, and power control A-MAP respectively. All the A-MAPs share a region of physical resources called the A-MAP region.

The non-user-specific A-MAP includes information that is not dedicated to a specific user or a specific group of users.

The HARQ feedback A-MAP carries HARQ Acknowledge (ACK)/Not ACK (NACK) information for uplink data transmission. The power control A-MAP carries fast power control command to the AMSs. The Assignment A-MAP has resource assignment information that is categorized into multiple types of assignment A-MAP IEs. Each assignment A-MAP IE is coded separately and carries information for one or a group of AMSs.

Figure 3:
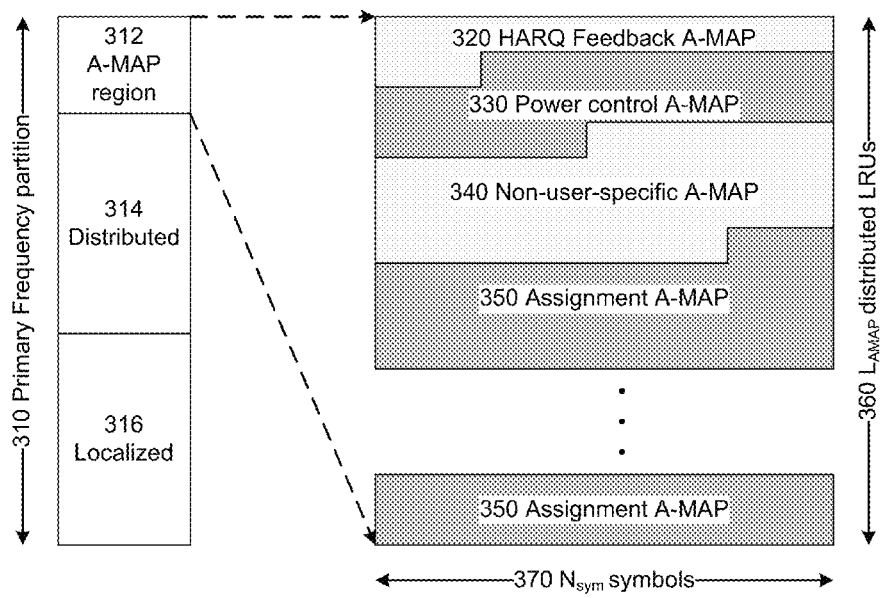
FIG. 3 illustrates a structure of an A-MAP region in accordance with one embodiment of the invention.

FIG. 3 illustrates a structure 300 of an A-MAP region in accordance with one embodiment of the invention. The primary frequency partition 310 has an A-MAP region 312, a distributed region 314 and a localized region 316. The A-MAP region 312 has a HARQ feedback A-MAP 320, a power control A-MAP 330, a non-user-specific A-MAP 340 and an assignment A-MAP 350. Each of the A-MAPs has a plurality of symbols 370.

The assignment A-MAP 350 includes, but is not limited to, a Down Link (DL) basic A-A-MAP IE, an Up Link (UL) basic A-A-MAP IE, a DL Subband A-A-MAP IE, an UL Subband A-A-MAP IE, a Feedback Allocation A-A-MAP IE, a UL Sounding Command A-A-MAP IE, a Code Division Multiple Access (CDMA) Allocation A-A-MAP IE, a DL Persistent Allocation A-A-MAP IE, an UL Persistent Allocation A-A-MAP IE, and a Feedback Polling A-A-MAP IE.

Figure 4:
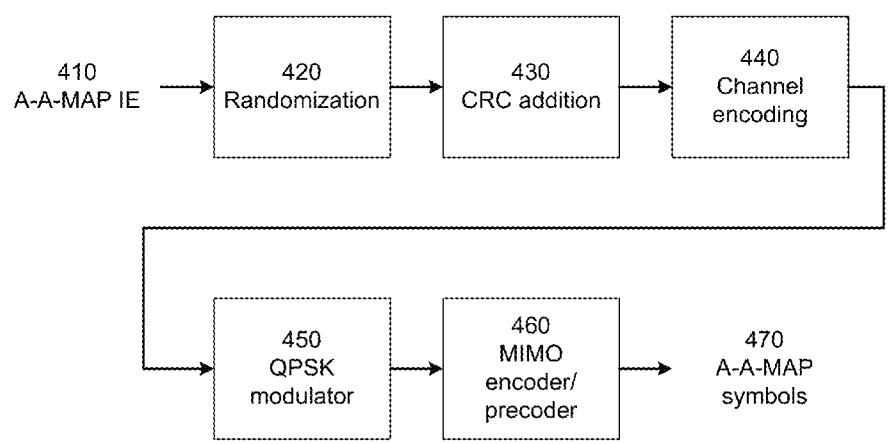
FIG. 4 illustrates a coding chain of A-A-MAP IE to A-A-MAP symbols in accordance with one embodiment of the invention.

FIG. 4 illustrates a coding chain 400 of A-A-MAP IE 410 to A-A-MAP symbols 470 in accordance with one embodiment of the invention. For clarity of illustration, FIG. 4 is discussed with reference to FIG. 1. The base station 120 generates an A-A-MAP IE for each AMS in one embodiment of the invention. The base station 120 sends the A-A-MAP IE to a randomization module 420 to generate a randomized A-A-MAP IE.

In one embodiment of the invention, the randomization module 420 has a Pseudo Random Binary Sequence (PRBS) generator to randomize or scramble the contents of the A-A-MAP IE. In one embodiment of the invention, the PRBS generator uses an initial vector to randomize the contents of the A-A-MAP IE. The initial vector includes, but is not limited to, an A-A-MAP CRC mask. When a unicast A-A-MAP is to be sent to a particular AMS, the base station 120 uses a station identification (STID) of the particular AMS A-A-MAP as the CRC mask. This allows the resulting random sequence to be different for different AMS and it allows only the AMS with the correct STID to decode the A-A-MAP IE.

The base station 120 sends the randomized A-A-MAP IE to the CRC addition module 430. The CRC addition module 430 generates a CRC checksum based on the randomized A-A-MAP IE. In one embodiment of the invention, the generated CRC checksum is masked using the A-A-MAP CRC mask. The CRC addition module 430 generates a masked CRC checksum by performing an exclusive OR operation on the generated CRC checksum with the A-A-MAP CRC mask to generate a masked CRC checksum. The CRC addition module 430 appends the masked CRC checksum to the randomized A-A-MAP IE and sends it to the channel encoding module 440.

The channel encoding module 440 performs channel encoding of the randomized A-A-MAP IE and the masked CRC checksum to generate channel encoded data. The generated channel encoded data is sent to the Quadrature Phase Shift Keying (QPSK) modulator 450. The QPSK modulator 450 performs QPSK modulation of the channel encoded data to generate QPSK modulated data and sends the QPSK modulated data to the Multiple-Input and Multiple-Output (MIMO) encoder/precoder 460. The MIMO encoder/precoder 460 performs MIMO encoding/precoding of the QPSK modulated data to generate the A-A-MAP symbols 470. The base station 120 sends the A-A-MAP symbols 470 to the AMSs 150 and 160 via the wireless communication links.

Figure 5:
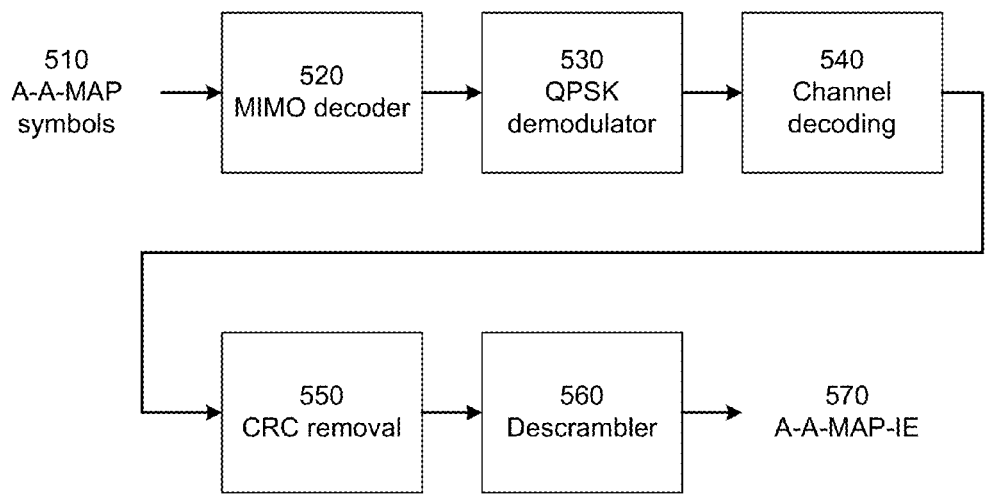
FIG. 5 illustrates a decoding chain of A-A-MAP symbols to A-A-MAP IE in accordance with one embodiment of the invention.

FIG. 5 illustrates a decoding chain 500 of A-A-MAP symbols 510 to A-A-MAP IE 570 in accordance with one embodiment of the invention. For clarity of illustration, FIG. 5 is discussed with reference to FIG. 1. In one embodiment of the invention, an AMS receives the A-A-MAP symbols 510 from the base station 120. The MIMO decoder 520 performs MIMO decoding of the A-A-MAP symbols 510 to generate QPSK modulated data.

The QPSK demodulator 530 receives the QPSK modulated data and performs QPSK demodulation of the QPSK modulated data to generate QPSK demodulated data. The channel decoding module 540 receives the QPSK demodulated data and performs channel decoding of the QPSK demodulated data to generate channel decoded data.

In one embodiment of the invention, the channel decoded data has a randomized A-A-MAP IE and a masked CRC. The CRC removal module 550 receives the channel decoded data and removes the mask of the masked CRC. In one embodiment of the invention, the CRC removal module 550 removes the mask of the masked CRC by performing bitwise exclusive OR operations on the masked CRC with a CRC mask to generate an unmasked CRC checksum. In one embodiment of the invention, the CRC mask comprises the STID of the AMS decoding the A-A-MAP symbols 510.

The CRC removal module 550 calculates a checksum of the randomized A-A-MAP IE and compares the calculated checksum with the unmasked CRC checksum. If the calculated checksum matches the unmasked CRC checksum, it indicates that the AMS is the intended recipient of the A-A-MAP IE and the CRC removal module 550 sends the randomized A-A-MAP IE to the descrambler module 560. This is because each AMS has a unique STID and only the AMS with the correct STID can unmask the masked CRC checksum to obtain the correct CRC checksum. If the calculated checksum does not match the unmasked CRC checksum, it indicates that the AMS is not the intended recipient of the A-A-MAP IE and the CRC removal module 550 discards the randomized A-A-MAP IE.

When the descrambler module 560 receives the randomized A-A-MAP IE, it descrambles the received randomized A-A-MAP IE to obtain a descrambled A-A-MAP IE. The AMS performs a sanity check on the descrambled A-A-MAP IE to determine whether the descrambled A-A-MAP IE is corrupted. In one embodiment of the invention, the AMS determines whether the descrambled A-A-MAP IE is corrupted by determining whether one or more parts of the descrambled A-A-MAP IE are set according to a pre-determined value.

For example, in one embodiment of the invention, the A-A-MAP IE has one or more reserved bits. The AMS determines whether the descrambled A-A-MAP IE is corrupted by determining whether the reserved bits are set to a pre-determined value. In another embodiment of the invention, the AMS determines whether the descrambled A-A-MAP IE is corrupted by determining whether one or more particular fields of the descrambled A-A-MAP IE is set beyond a pre-determined value or range. For example, a particular field in the A-A-MAP IE has a minimum range and/or a maximum range setting. The AMS determines whether the descrambled A-A-MAP IE is corrupted by determining whether the particular field of the descrambled A-A-MAP IE is set beyond minimum range and/or a maximum range setting. One of ordinary skill in the relevant art will readily appreciate that other ways of determining whether the descrambled A-A-MAP IE is corrupted can be used without affecting the workings of the invention.

In one embodiment of the invention, the randomization of the contents of the A-A-MAP IE increased the probability of detecting false A-A-MAP IE. This is because when the A-A-MAP IE is sent without any randomization, an error pattern is detectable by sanity check only if it occupies all or part of the reserved bits. With A-A-MAP IE randomization, the detection of error(s) is independent of the error pattern because the scrambling can create invalid values in the reserved bits. The reserved bits in any location of the A-A-MAP IE are randomized automatically to achieve full usage of the reserved bits in any configuration. In addition, if there are one or more bits in the A-A-MAP IE that are set to a fixed value, these one or more bits are also scrambled to allow more sanity checks to reduce the probability of false detection.

Figure 6:
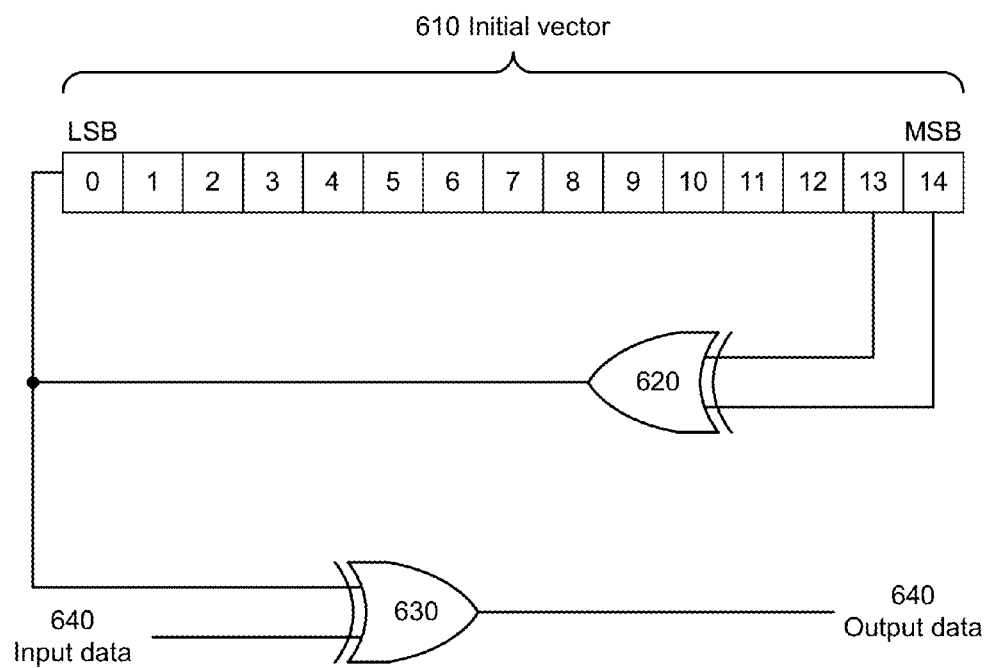
FIG. 6 illustrates a Pseudo Random Binary Sequence module in accordance with one embodiment of the invention.

FIG. 6 illustrates a PRBS module 600 in accordance with one embodiment of the invention. For clarity of illustration, FIG. 6 is discussed with reference to FIGS. 4 and 5. In one embodiment of the invention, the PRBS module 600 is present in the randomization module 420 and the descrambler module 560. The PRBS module 600 has an initial vector 610 that has fifteen bits in one embodiment of the invention. In one embodiment of the invention, the polynomial of the PRBS module is set as $1+X^{14}+X^{15}$. The exclusive OR (XOR) gate 620 uses the output of bits 13 and 14 of the initial vector 610 as its inputs. The XOR gate 620 generates an output for bit 0 of the initial vector 610.

In the randomization module 420, the input data 640 comprises the A-A-MAP IE 410. The initial vector 610 is set as the STID of the AMS associated with the A-A-MAP IE 410. The contents of the A-A-MAP IE 410 is fed or read sequentially/serially (Most Significant Bit (MSB) first) to the PRBS module 600. The bits of the A-A-MAP IE 410 are XOR-ed with the output of the PRBS module 600 using the XOR gate 630, where the MSB of the A-A-MAP IE 410 is XOR-ed with the first bit of the output of the PRBS module 600. The output data 640 of the PRBS module 600 forms the randomized A-A-MAP IE in one embodiment of the invention.

In the descrambler module 560, the input data 640 comprises the randomized A-A-MAP IE. The initial vector 610 is set as the STID of the AMS associated with the A-A-MAP IE 410. The contents of the randomized A-A-MAP IE is fed or read sequentially/serially (MSB first) to the PRBS module 600. The bits of the randomized A-A-MAP IE are XOR-ed with the output of the PRBS module 600 using the XOR gate 630, where the MSB of the randomized A-A-MAP IE is XOR-ed with the first bit of the output of the PRBS module 600. The output data 640 of the PRBS module 600 forms the de-randomized or descrambled A-A-MAP IE in one embodiment of the invention.

The PRBS module 600 illustrated in FIG. 6 is not meant to be limiting. In other embodiments of the invention, the PRBS module uses a different polynomial to scramble or unscramble the input data 640 without affecting the workings of the invention.

Figure 7:
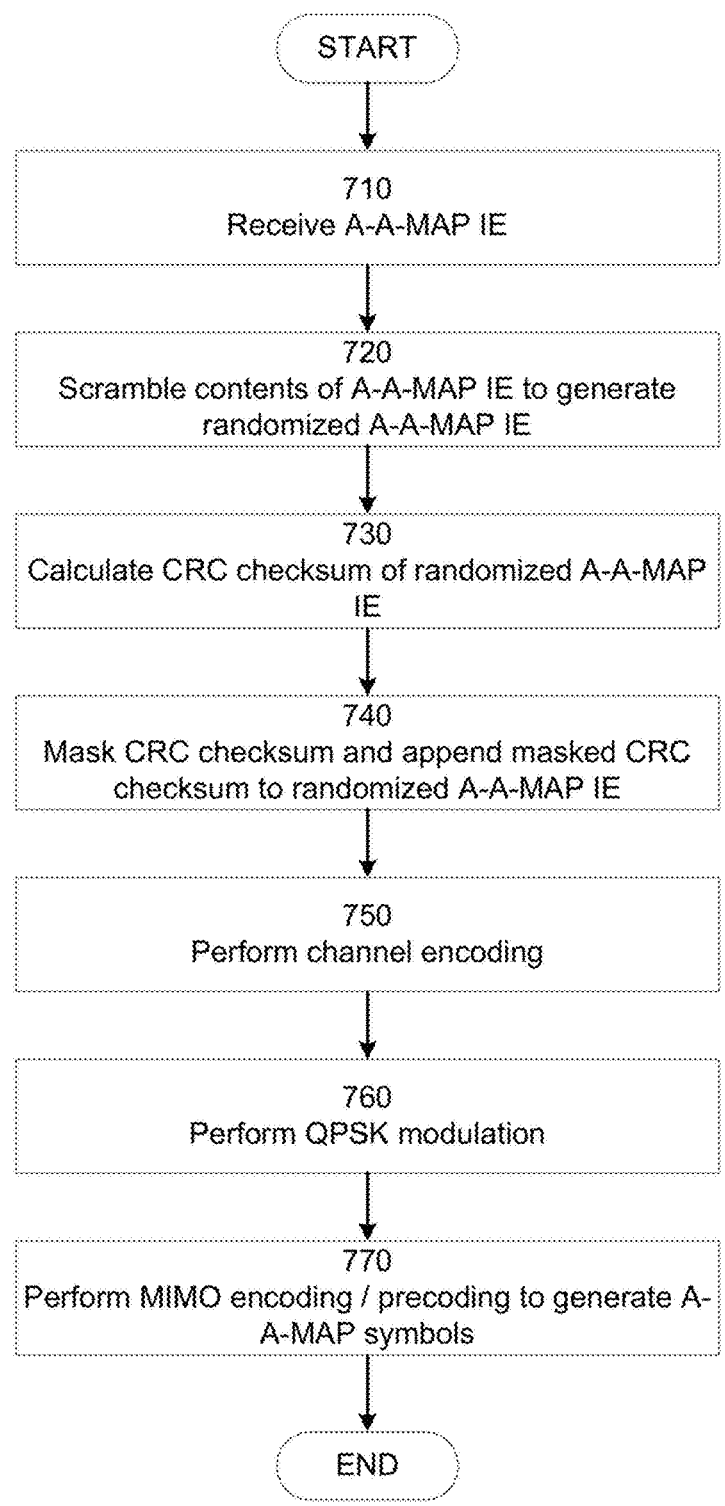
FIG. 7 illustrates a flowchart of a scrambling operation in accordance with one embodiment of the invention.

FIG. 7 illustrates a flowchart 700 of a scrambling operation in accordance with one embodiment of the invention. In step 710, the flow 700 receives an A-A-MAP IE. In step 720, the contents of the A-A-MAP IE are scrambled to generate a randomized A-A-MAP IE. In one embodiment of the invention, the contents of the A-A-MAP IE are scrambled using the PRBS module 600 that uses a STID of the AMS associated with the A-A-MAP IE as the initial vector.

In step 730, the CRC checksum of the randomized A-A-MAP IE is calculated. In step 740, the flow 700 performs an operation to mask the CRC checksum and appends the masked CRC checksum to the randomized A-A-MAP IE. In step 750, the flow 700 performs a channel encoding of the randomized A-A-MAP IE and the masked CRC checksum. In step 760, the flow 700 performs a QPSK modulation of the channel encoded data. In step 770, the flow 700 performs a MIMO encoding/precoding of the QPSK modulated data to generate the A-A-MAP symbols. The A-A-MAP symbols are transmitted to the AMS via a wireless communication link.

Figure 8:
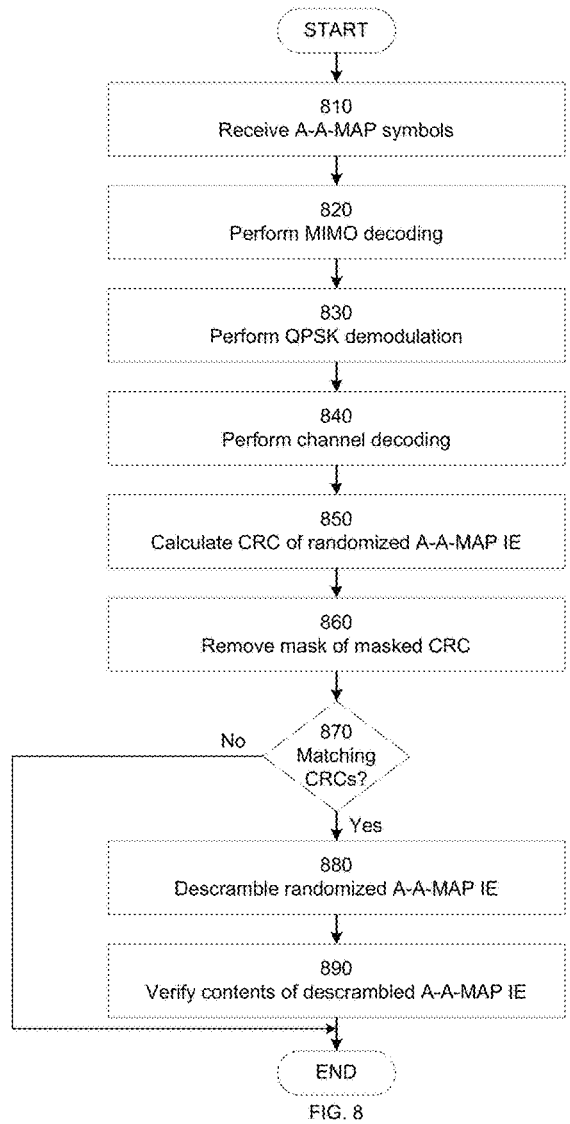
FIG. 8 illustrates a flowchart of a descrambling operation in accordance with one embodiment of the invention.

FIG. 8 illustrates a flowchart 800 of a descrambling operation in accordance with one embodiment of the invention. In step 810, the flow 800 receives a plurality of A-A-MAP symbols via a wireless communication link. In step 820, the flow 800 performs a MIMO decoding of the plurality of A-A-MAP symbols to generate QPSK modulated data. In step 830, the flow 800 performs a QPSK demodulation of the QPSK modulated data to generate channel encoded data.

In step 840, the flow 800 performs a channel decoding of the channel encoded data to generate channel decoded data. In one embodiment of the invention, the channel decoded data comprises a randomized A-A-MAP IE and a masked CRC checksum. In step 850, the flow 800 performs a CRC calculation of the randomized A-A-MAP IE to generate or create a CRC checksum. In step 860, the flow 800 removes the mask of the masked CRC checksum. In one embodiment of the invention, the mask of the masked CRC checksum is removed by performing an XOR operation on the masked CRC checksum with a STID of the AMS receiving the plurality of A-A-MAP symbols.

In step 870, the flow 800 checks whether the calculated checksum from step 850 is the same as the unmasked CRC checksum from step 860. If the CRC checksums are matching, it indicates that the AMS receiving the plurality of A-A-MAP symbols is the intended recipient. This is because when the base station creates the masked CRC checksum, it uses the STID of the intended AMS and only the intended AMS is able to unmask the masked CRC checksum correctly. The flow 800 goes to step 880 when the CRC checksums are matching. If the CRC check sums do not match, the flow 800 ends.

In step 880, the flow 800 descrambles the randomized A-A-MAP IE. In one embodiment of the invention, the randomized A-A-MAP IE is descrambled by the PRBS module 600 that uses the STID of the AMS receiving the plurality of A-A-MAP symbols as its initial vector. In step 890, the flow 800 verifies the contents of the descrambled A-A-MAP IE. In one embodiment of the invention, the flow 800 verifies the contents of the descrambled A-A-MAP IE by checking whether the reserved bits in the descrambled A-A-MAP IE are set to a known value. In another embodiment of the invention, one or more fields in the descrambled A-A-MAP IE have a minimum and/or maximum range of settings. The flow 800 verifies the contents of the descrambled A-A-MAP IE by checking whether the one or more fields in the descrambled A-A-MAP IE are set beyond their minimum and/or maximum range of settings.

Figure 9:
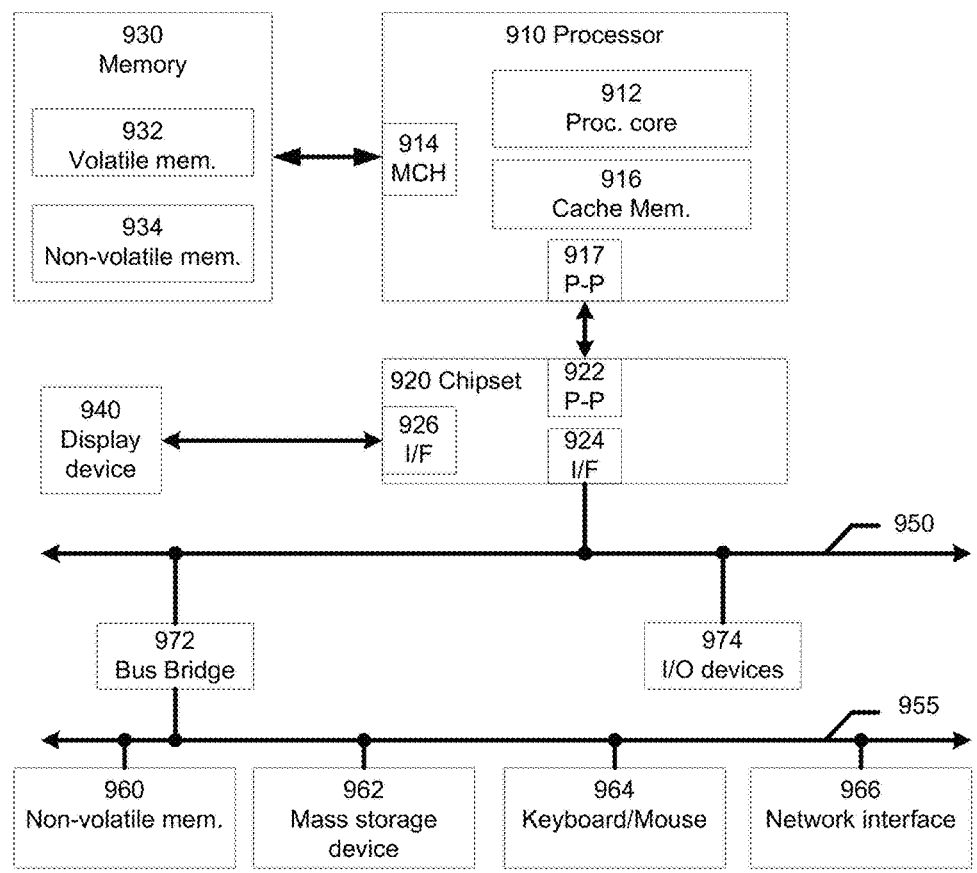
FIG. 9 illustrates a system to implement the methods disclosed herein in accordance with one embodiment of the invention.

FIG. 9 illustrates a system 900 to implement the methods disclosed herein in accordance with one embodiment of the invention. The system 900 includes, but is not limited to, a desktop computer, a laptop computer, a net book, a notebook computer, a personal digital assistant (PDA), a server, a workstation, a cellular telephone, a mobile computing device, an Internet appliance or any other type of computing device. In another embodiment, the system 900 used to implement the methods disclosed herein may be a system on a chip (SOC) system.

The processor 910 has a processing core 912 to execute instructions of the system 900. The processing core 912 includes, but is not limited to, pre-fetch logic to fetch instructions, decode logic to decode the instructions, execution logic to execute instructions and the like. The processor 910 has a cache memory 916 to cache instructions and/or data of the system 900. In another embodiment of the invention, the cache memory 916 includes, but is not limited to, level one, level two and level three, cache memory or any other configuration of the cache memory within the processor 910.

The memory control hub (MCH) 914 performs functions that enable the processor 910 to access and communicate with a memory 930 that includes a volatile memory 932 and/or a non-volatile memory 934. The volatile memory 932 includes, but is not limited to, Synchronous Dynamic Random Access Memory (SDRAM), Dynamic Random Access Memory (DRAM), RAMBUS Dynamic Random Access Memory (RDRAM), and/or any other type of random access memory device. The non-volatile memory 934 includes, but is not limited to, NAND flash memory, phase change memory (PCM), read only memory (ROM), electrically erasable programmable read only memory (EEPROM), or any other type of non-volatile memory device.

The memory 930 stores information and instructions to be executed by the processor 910. The memory 930 may also stores temporary variables or other intermediate information while the processor 910 is executing instructions. The chipset 920 connects with the processor 910 via Point-to-Point (PtP) interfaces 917 and 922. The chipset 920 enables the processor 910 to connect to other modules in the system 900. In one embodiment of the invention, the interfaces 917 and 922 operate in accordance with a PtP communication protocol such as the Intel® QuickPath Interconnect (QPI) or the like. The chipset 920 connects to a display device 940 that includes, but is not limited to, liquid crystal display (LCD), cathode ray tube (CRT) display, or any other form of visual display device.

In addition, the chipset 920 connects to one or more buses 950 and 955 that interconnect the various modules 974, 960, 962, 964, and 966. Buses 950 and 955 may be interconnected together via a bus bridge 972 if there is a mismatch in bus speed or communication protocol. The chipset 920 couples with, but is not limited to, a non-volatile memory 960, a mass storage device(s) 962, a keyboard/mouse 964 and a network interface 966. The mass storage device 962 includes, but is not limited to, a solid state drive, a hard disk drive, an universal serial bus flash memory drive, or any other form of computer data storage medium. The network interface 966 is implemented using any type of well known network interface standard including, but not limited to, an Ethernet interface, a universal serial bus (USB) interface, a Peripheral Component Interconnect (PCI) Express interface, a wireless interface and/or any other suitable type of interface. The wireless interface operates in accordance with, but is not limited to, the IEEE 802.11 standard and its related family, Home Plug AV (HPAV), Ultra Wide Band (UWB), Bluetooth, WiMax, or any form of wireless communication protocol.

While the modules shown in FIG. 9 are depicted as separate blocks within the system 900, the functions performed by some of these blocks may be integrated within a single semiconductor circuit or may be implemented using two or more separate integrated circuits. For example, although the cache memory 916 is depicted as a separate block within the processor 910, the cache memory 916 can be incorporated into the processor core 912 respectively. The system 900 may include more than one processor/processing core in another embodiment of the invention.

The methods disclosed herein can be implemented in hardware, software, firmware, or any other combination thereof.

Although examples of the embodiments of the disclosed subject matter are described, one of ordinary skill in the relevant art will readily appreciate that many other methods of implementing the disclosed subject matter may alternatively be used. In the preceding description, various aspects of the disclosed subject matter have been described. For purposes of explanation, specific numbers, systems and configurations were set forth in order to provide a thorough understanding of the subject matter. However, it is apparent to one skilled in the relevant art having the benefit of this disclosure that the subject matter may be practiced without the specific details. In other instances, well-known features, components, or modules were omitted, simplified, combined, or split in order not to obscure the disclosed subject matter.

The term "is operable" used herein means that the device, system, protocol etc, is able to operate or is adapted to operate for its desired functionality when the device or system is in off-powered state. Various embodiments of the disclosed subject matter may be implemented in hardware, firmware, software, or combination thereof, and may be described by reference to or in conjunction with program code, such as instructions, functions, procedures, data structures, logic, application programs, design representations or formats for simulation, emulation, and fabrication of a design, which when accessed by a machine results in the machine performing tasks, defining abstract data types or low-level hardware contexts, or producing a result.

The techniques shown in the figures can be implemented using code and data stored and executed on one or more computing devices such as general purpose computers or computing devices. Such computing devices store and communicate (internally and with other computing devices over a network) code and data using machine-readable media, such as machine readable storage media (e.g., magnetic disks; optical disks; random access memory; read only memory; flash memory devices; phase-change memory) and machine readable communication media (e.g., electrical, optical, acoustical or other form of propagated signals—such as carrier waves, infrared signals, digital signals, etc.).

While the disclosed subject matter has been described with reference to illustrative embodiments, this description is not intended to be construed in a limiting sense. Various modifications of the illustrative embodiments, as well as other embodiments of the subject matter, which are apparent to persons skilled in the art to which the disclosed subject matter pertains are deemed to lie within the scope of the disclosed subject matter.

What is claimed is:

1. An apparatus comprising:
    a memory;
    a processor coupled with the memory, the processor to:
    generate an Assignment Advanced Media Access Protocol (A-A-MAP) Information Element (IE) associated with an advanced mobile station (AMS); and
    generate a randomized A-A-MAP IE comprising a Pseudo Random Binary Sequence (PRBS) based at least in part on the A-A-MAP IE and a A-A-MAP Cyclic Redundancy Check (CRC) mask.

2. The apparatus of claim 1, wherein the A-A-MAP CRC mask comprises a station identification (STID) of the AMS.

3. The apparatus of claim 1, wherein the processor is further to:
    generate a Cyclic Redundancy Check (CRC) checksum based on the randomized A-A-MAP IE;
    perform an exclusive OR operation on the generated CRC checksum with a CRC mask to generate a masked CRC checksum; and append the masked CRC checksum to the randomized A-A-MAP IE.

4. The apparatus of claim 3, wherein the processor is further to:
perform channel encoding of the randomized A-A-MAP IE and the masked CRC checksum to generate channel encoded data;
perform Quadrature Phase Shift Keying (QPSK) modulation of the channel encoded data to generate QPSK modulated data; and
perform Multiple-Input and Multiple-Output (MIMO) encoding of the QPSK modulated data to generate A-A-MAP symbols.

5. The apparatus of claim 1, wherein the A-A-MAP IE comprises one of a Down Link (DL) basic A-A-MAP IE, an Up Link (UL) basic A-A-MAP IE, a DL Subband A-A-MAP IE, an UL Subband A-A-MAP IE, a Feedback Allocation A-A-MAP IE, a UL Sounding Command A-A-MAP IE, a Code Division Multiple Access (CDMA) Allocation A-A-MAP IE, a DL Persistent Allocation A-A-MAP IE, an UL Persistent Allocation A-A-MAP IE, and a Feedback Polling A-A-MAP IE.

6. The apparatus of claim 1, wherein the apparatus is operable at least in part with one of Institute of Electrical and Electronics Engineers (IEEE) 802.16m standard, and a 3rd Generation Partnership Project (3GPP) Long Term Evolution standard.

7. An apparatus comprising:
a radio to receive a randomized A-A-MAP IE comprising a Pseudo Random Binary Sequence (PRBS) based at least in part on a A-A-MAP IE and a A-A-MAP Cyclic Redundancy Check (CRC) mask; and
a processor coupled with the radio and configured to:
descramble the received randomized A-A-MAP IE to obtain a descrambled A-A-MAP IE; and
determine whether the descrambled A-A-MAP IE is corrupted;
wherein the processor to descramble the received randomized A-A-MAP IE to obtain the descrambled A-A-MAP is to perform an exclusive OR operation on the received randomized A-A-MAP IE with the CRC mask to generate the descrambled A-A-MAP.

8. The apparatus of claim 7, wherein the CRC mask comprises an identification of the apparatus.

9. The apparatus of claim 7, wherein the processor to determine whether the descrambled A-A-MAP IE is corrupted is to:
determine whether one or more parts of the descrambled A-A-MAP IE are set according to a pre-determined value.

10. The apparatus of claim 9, wherein the one or more parts of the descrambled A-A-MAP IE comprise one or more of a reserved bit field, and a fixed value field of the descrambled A-A-MAP IE.

11. The apparatus of claim 7, wherein the processor to determine whether the descrambled A-A-MAP IE is corrupted is to:
determine whether one or more parts of the descrambled A-A-MAP IE are set beyond a pre-determined value.

12. The apparatus of claim 7, wherein the radio is further to receive a plurality of A-A-MAP symbols; and
the processor is further to:
perform Multiple-Input and Multiple-Output (MIMO) decoding of the plurality of A-A-MAP symbols to generate A-A-MAP modulated data;
perform Quadrature Phase Shift Keying (QPSK) demodulation of the A-A-MAP modulated data to generate QPSK demodulated data; and
perform channel decoding of the QPSK demodulated data to generate channel decoded data.

13. The apparatus of claim 12, wherein the channel decoded data comprises the received randomized A-A-MAP IE and a masked CRC, and wherein the processor is further to:
perform a bitwise exclusive OR operation on the masked CRC with the CRC mask to generate a CRC checksum; and
determine whether the CRC checksum is correct.

14. The apparatus of claim 7, wherein the descrambled A-A-MAP IE is an unicast A-A-MAP IE and wherein the unicast A-A-MAP IE comprises one of a Down Link (DL) basic A-A-MAP IE, an Up Link (UL) basic A-A-MAP IE, a DL Subband A-A-MAP IE, an UL Subband A-A-MAP IE, a Feedback Allocation A-A-MAP IE, a UL Sounding Command A-A-MAP IE, a Code Division Multiple Access (CDMA) Allocation A-A-MAP IE, a DL Persistent Allocation A-A-MAP IE, an UL Persistent Allocation A-A-MAP IE, and a Feedback Polling A-A-MAP IE.

15. The apparatus of claim 7, wherein the apparatus is operable at least in part with one of Institute of Electrical and Electronics Engineers (IEEE) 802.16m standard, and a 3rd Generation Partnership Project (3GPP) Long Term Evolution standard.

16. A computer-implemented method comprising:
constructing, by the computing device, a plurality of Assignment Advanced Media Access Protocol (A-A-MAP) symbols by encoding an A-A-MAP Information Element (IE), wherein the A-A-MAP IE is randomized; and
generating, by the computing device, a Pseudo Random Binary Sequence (PRBS) based at least in part on the A-A-MAP IE and a A-A-MAP Cyclic Redundancy Check (CRC) mask, wherein the randomized A-A-MAP IE comprises the generated PRBS.

17. The computer-implemented method of claim 16, wherein the A-A-MAP IE is associated with an advanced mobile station (AMS), and wherein the A-A-MAP CRC mask comprises a station identification (STID) of the AMS.

18. The computer-implemented method of claim 16, wherein constructing the plurality of A-A-MAP symbols by encoding the A-A-MAP IE comprises:
generating, by the computing device a CRC checksum based on the randomized A-A-MAP IE;
performing, by the computing device, an exclusive OR operation on the generated CRC checksum with the A-A-MAP CRC mask to generate a masked CRC checksum; and
appending, by the computer device, the masked CRC checksum to the randomized A-A-MAP IE.

19. The computer-implemented method of claim 18, wherein constructing the plurality of A-A-MAP symbols by encoding the A-A-MAP IE further comprises:
performing, by the computing device, channel encoding of the randomized A-A-MAP IE and the masked CRC checksum to generate channel encoded data;
performing, by the computing device, Quadrature Phase Shift Keying (QPSK) modulation of the channel encoded data to generate QPSK modulated data; and
performing, by the computing device, Multiple-Input and Multiple-Output (MIMO) encoding of the QPSK modulated data to generate the plurality of A-A-MAP symbols.

20. A computer-implemented method comprising:
- descrambling, by the computing device, a received randomized A-A-MAP IE to obtain a descrambled A-A-MAP IE, the randomized A-A-MAP IE comprising a Pseudo Random Binary Sequence (PRBS) based at least in part on a A-A-MAP IE and a A-A-MAP Cyclic Redundancy Check (CRC) mask; and
- determining, by the computing device, whether the descrambled A-A-MAP IE is corrupted;
- wherein determining whether the descrambled A-A-MAP IE is corrupted comprises:
- determining, by the computing device, whether one or more parts of the descrambled A-A-MAP IE are set according to a pre-determined value or set beyond a pre-determined value, wherein the one or more parts of the descrambled A-A-MAP IE comprise one or more of a reserved bit field, and a fixed value field of the descrambled A-A-MAP IE.

21. The computer-implemented method of claim 20, wherein descrambling the received randomized A-A-MAP IE to obtain the descrambled A-A-MAP IE comprises:
- performing, by the computing device, an exclusive OR operation on the received randomized A-A-MAP IE with the CRC mask to generate the descrambled A-A-MAP.

22. The computer-implemented method of claim 20, further comprising:
- receiving, by the computing device, a plurality of A-A-MAP symbols;
- performing, by the computing device, Multiple-Input and Multiple-Output (MIMO) decoding of the plurality of A-A-MAP symbols to generate A-A-MAP modulated data;
- performing, by the computing device, Quadrature Phase Shift Keying (QPSK) demodulation of the A-A-MAP modulated data to generate QPSK demodulated data; and
- performing, by the computing device, channel decoding of the QPSK demodulated data to generate channel decoded data.

23. The computer-implemented method of claim 22, wherein the channel decoded data comprises the received randomized A-A-MAP IE and a masked CRC, the method further comprising:
- performing, by the computing device, a bitwise exclusive OR operation on the masked CRC with the CRC mask to generate a CRC checksum; and
- determine, by the computing device, whether the CRC checksum is correct.

* * * * *